United States Patent Office 3,401,954
Patented Sept. 17, 1968

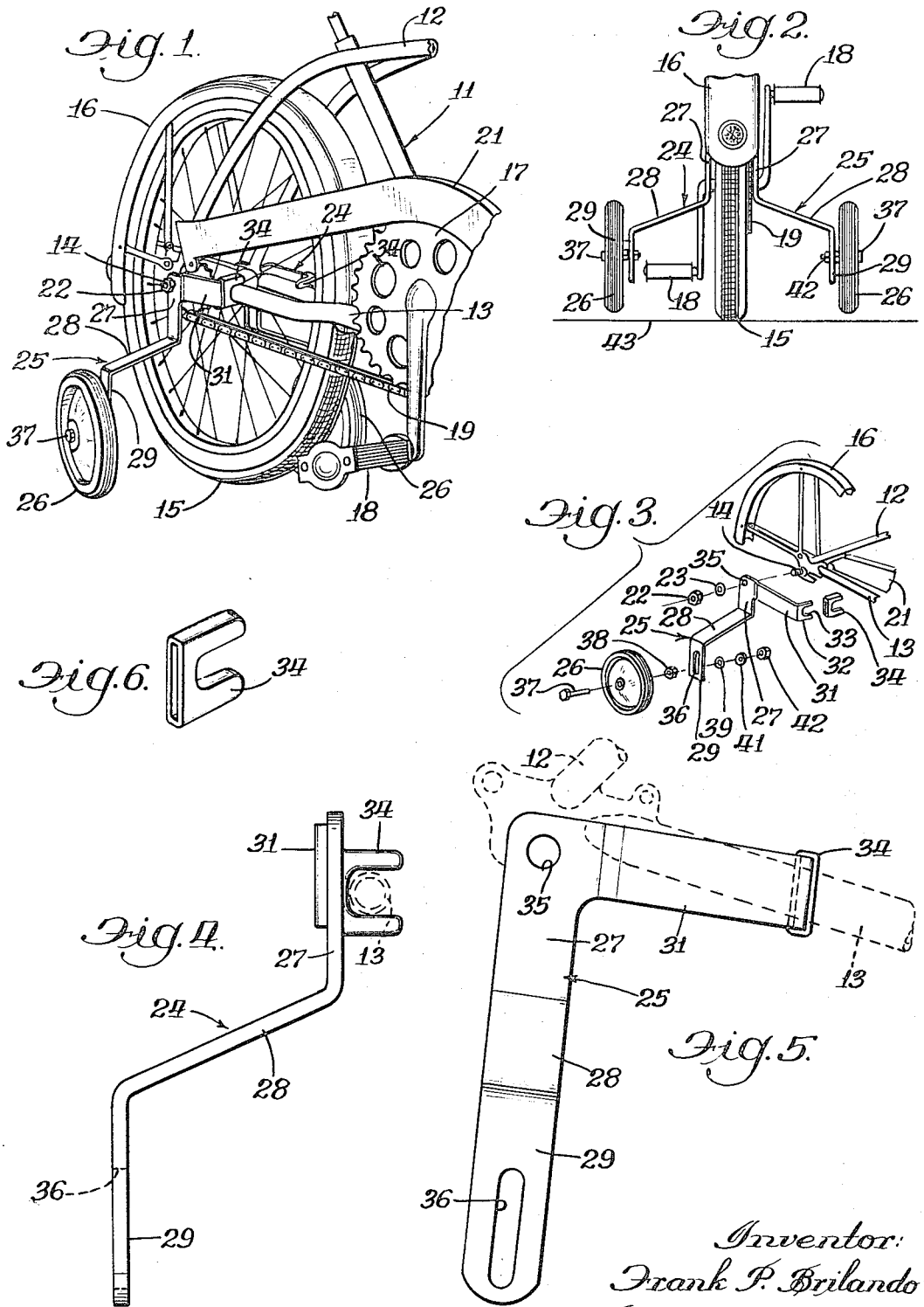

3,401,954
BICYCLE TRAINING ATTACHMENT
Frank P. Brilando, Niles, Ill., assignor to Schwinn Bicycle
Company, a corporation of Illinois
Filed Apr. 4, 1966, Ser. No. 540,170
4 Claims. (Cl. 280—293)

ABSTRACT OF THE DISCLOSURE

Cycle training aid for each side of bicycle comprising unitary wheel-mounting support with outwardly extending arm mounted at inner end on bicycle axle as sole point of securing same to bicycle and mounting wheel at outer end, with integral arm extending forwardly at about ninety degrees and terminating in inward extension with inwardly extending open-ended slot engaging rear fork of bicycle; the forwardly extending arm offset slightly outwardly to avoid damage to chain guard; and hollow substantially U-shaped plastic tip mounted on and enclosing major portion of inward extension to protect rear fork against injury due to engagement of support therewith.

---

This invention relates in general to training aids to assist a novice in learning to ride a bicycle, and more particularly to cycle aids comprising auxiliary wheel-mounting supports removably attachable to a bicycle on each side thereof to maintain the same in substantially vertical position.

Heretofore, cycle aids of this type comprised either multiple-part supports employing a wheel-mounting arm and a separate strut interconnecting the arm with the bicycle frame, or one-piece supports which engage the rear stay of the bicycle, rather than the rear fork, and consequently are likely to be interfered with by, and to cause damage to, the chain guard, and apply a maximum bending moment to the support and cause wheel drag in going around a curve, since the cycle aid wheel then falls behind the center of the rear bicycle wheel to a degree depending upon the angle of the frame stay, and the wheels do not turn on substantially the same fulcrum.

A principal object of this invention, therefore, is to overcome such difficulties in a cycle aid, and this is accomplished by providing a unitary or one-piece support for each side of the bicycle having an outwardly extending arm mounted at its inner end on the rear axle and carrying a wheel at its outer end, and a forwardly extending arm formed integrally with the outwardly extending arm and defining an angle therewith of approximately ninety degrees and terminating at its forward end in an inward extension for engaging the adjacent arm of the rear fork.

Another object of the invention is to provide a cycle aid of as simple construction as possible and to facilitate the mounting thereof on, and removal from, a bicycle, since the same is employed only as a temporary expedient. This object is attained by providing a cycle aid which is mounted on the rear axle of the bicycle and requires only the removal and replacement of the axle nuts to effect its mounting or removal.

A further important object is to insure against any possibility of the use of such a cycle aid defacing or otherwise damaging the bicycle, and this is accomplished by designing the cycle aid so that, in addition to the axle and its nut, it contacts only the rear fork of the bicycle frame and is covered at its points of contact with the latter by a plastic protector to prevent marring of the paint on the bicycle.

Numerous other objects and advantages of the invention will be apparent as it is better understood from the following description, which, when taken in connection with the accompanying drawings, discloses a preferred embodiment thereof.

In the drawings:

FIG. 1 is a perspective view of part of the rear portion of a bicycle with a cycle aid embodying the features of this invention attached or mounted thereon;

FIG. 2 is a rear elevational view of the mechanism of FIG. 1;

FIG. 3 is an exploded perspective showing the parts of the left-hand auxiliary support disassembled;

FIG. 4 is an enlarged rear elevational view of the left-hand support;

FIG. 5 is a side elevation, as seen from the right side of FIG. 2, of the right-hand support on the same scale as FIG. 4, with parts of the bicycle frame shown in broken lines; and FIG. 6 is a perspective view on the scale of FIGS. 4 and 5 of a plastic protective tip for the inwardly extending arms of the supports.

Referring more particularly to FIG. 1, reference numeral 11 indicates in general a bicycle which includes a frame having a rear stay 12 and rear fork 13 for supporting a rear axle 14 and rear wheel 15 in well-known manner. Also shown is a fender 16 for the wheel 15, a drive sprocket 17 operable by pedals 18, the usual chain 19 and a chain guard 21 extending rearwardly shortly beyond a portion of the right-hand rear stay 12. The axle 14 is secured to the associated parts of the frame to rotatably support the wheel 15 by means of the usual axle nuts 22 normally tightened against washers 23 (FIG. 3).

The cycle aid embodying the features of this invention as herein illustrated comprises left-hand and right-hand unitary supports indicated in general, respectively, by reference numerals 24 and 25 for auxiliary wheels 26. Each of these unitary supports is made up of an outwardly extending arm having a vertical inner end 27 for mounting on the axle 14, an intermediate portion 28 sloping downward slightly from the inner end, and a substantially vertical outer end 29. Each of the supports 24 and 25 also comprises a forwardly extending arm 31 formed integrally with the outwardly extending arm 27–29 and defining an angle therewith of approximately ninety degrees (FIG. 5). As best seen in FIG. 4, the main body of each forwardly extending arm 31 is slightly offset outwardly and terminates (FIG. 3) at its forward end in an inward extension 32 with an end slot 33 defining a substantially U-shaped portion for engagement with the adjacent arm of the rear fork 13.

In order to protect the rear fork 13 against injury due to the engagement of the supports therewith, a hollow, substantially U-shaped plastic tip 34 (FIG. 6) is mounted on the inward end-slotted extension 32 of each support 24 and 25.

As best seen in FIGS. 3 and 5, each of the supports 24 and 25 is provided in its central portion at the junction of its outwardly and forwardly extending arms with an aperture 35 for receiving the associated end of the rear axle 14 to facilitate its attachment by means of the regular axle nuts 22. The substantially vertical outer end 29 of each support has a vertically elongated slot 36 to adjustably receive a bolt 37 extending through the wheel 26 as an axle. A nut 38 interposed between the wheel and the support end 29 retains the wheel on its axle, and the latter is secured in selected adjusted position in the slot 36 by means of a lock washer 39 (FIG. 3), a plain washer 41 and a nut 42.

From this description, it will be appreciated that it is an extremely simple matter to mount the instant cycle aid on any bicycle. All that is required is to remove the axle nuts and washers 22, 23, mount the left-hand and right-hand supports 24 and 25 on the associated ends of the axle 14 with the inwardly extending slotted portions 32 and their plastic protective tips 34 engaging the associated arms of the rear fork 13, and replace the axle washers 23 and nuts 22. After the training aid has served its purpose, it is an equally simple matter to remove the supports 24 and 25, and because of the inclusion of the plastic tips 34 and the engagement thereof with the rear fork 13 rather than the rear stays 12, no damage will have resulted to the bicycle from their use. In this regard, engagement of one arm of an axle-mounted auxiliary support to the right-hand rear stay 12 normally would result in contact with, and damage to, the chain guard 21. This is obviated by the above-described attachment of the support to the rear fork 13, and the outward offset of the forwardly extending arm 31 further assures non-interference with the chain guard. The plastic tips 34, although held in tight engagement with the associated arms of the rear fork 13, will not mar the paint or otherwise damage those arms of the rear fork.

It will also be appreciated that the auxiliary wheels 26 may be adjustably mounted vertically relative to their supports 24 and 25 so that the instant cycle aid may be used with bicycles having rear wheels of different diameters and the auxiliary wheels 26 may be disposed normally slightly above the ground or other surface supporting a bicycle, as represented by the line 43 in FIG. 2, when the bicycle is in a centrally upright or vertical position. The function of this cycle aid to prevent lateral tilting of the bicycle in either direction beyond the limited amount determined by such normal spacing of the auxiliary wheels 26 from the surface 43 is well-known in the art, but the arrangement of the parts providing a unitary support structure at each side mounted on the axle and otherwise engaging only the rear fork provides the desired improved structure and results as initially noted herein.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A cycle aid for use on a bicycle having a frame with a rear fork and an axle for a rear wheel, comprising a unitary support having an outwardly extending arm mounted at its inner end on said axle as the sole point of securing the cycle aid to the bicycle and formed to mount a wheel on its outer end, and a forwardly extending arm formed integrally with said outwardly extending arm and defining an angle therewith of approximately ninety degrees and terminating at its forward end in an inward extension with an inwardly extending open-ended slot for engaging the adjacent arm of said rear fork.

2. A cycle aid according to claim 1, wherein said inward end-slotted extension is substantially U-shaped, and a hollow substantially U-shaped plastic tip enclosing the major portion of said extension to protect said rear fork against injury due to the engagement of said support therewith.

3. A cycle aid according to claim 1 for use on a bicycle also having a chain guard extending forwardly from a point adjacent said axle, wherein said forwardly extending arm is offset slightly outwardly from the inner end of said outwardly extending arm to avoid any possibility of damage thereby to said chain guard.

4. In a cycle aid according to claim 3, a hollow plastic tip mounted on said inward extension to protect said rear fork against injury due to the engagement of said support therewith.

References Cited

UNITED STATES PATENTS

| | | | |
|---|---|---|---|
| 1,241,423 | 9/1917 | Myrie | 280—304 |
| 2,527,431 | 10/1950 | Kutil | 280—293 |
| 2,784,008 | 3/1957 | Pearl | 280—304 |
| 2,828,141 | 3/1958 | Erstad et al. | 280—304 |
| 2,976,057 | 3/1961 | Krokos et al. | 280—293 |

KENNETH H. BETTS, *Primary Examiner.*